(12) United States Patent
Van Der Wateren

(10) Patent No.: US 8,159,938 B2
(45) Date of Patent: Apr. 17, 2012

(54) BROADCAST-ONLY DISTRIBUTED WIRELESS NETWORK

(75) Inventor: Frits Van Der Wateren, Haarlem (NL)

(73) Assignee: C.H.e.S.S. Embedded Technology B.V., Haarlem (NL)

( * ) Notice: Subject to any disclaimer, the term of this patent is extended or adjusted under 35 U.S.C. 154(b) by 830 days.

(21) Appl. No.: 12/215,040

(22) Filed: Jun. 23, 2008

(65) Prior Publication Data
US 2009/0316679 A1    Dec. 24, 2009

(51) Int. Cl.
    H04L 12/26    (2006.01)
(52) U.S. Cl. ....................................................... 370/229
(58) Field of Classification Search .................. 370/229, 370/230, 310, 400, 431–432, 442–445; 709/223–229, 248
See application file for complete search history.

(56) References Cited

U.S. PATENT DOCUMENTS

| | | | |
|---|---|---|---|
| 5,644,576 | A | 7/1997 | Bauchot et al. |
| 6,510,150 | B1 | 1/2003 | Ngo |
| 6,816,510 | B1 | 11/2004 | Banerjee |
| 6,970,448 | B1 | 11/2005 | Sparrell et al. |
| 7,046,639 | B2 * | 5/2006 | Garcia-Luna-Aceves et al. ........ 370/314 |
| 7,496,059 | B2 * | 2/2009 | Yoon ............................. 370/311 |
| 7,675,863 | B2 * | 3/2010 | Werb et al. ..................... 370/241 |
| 7,885,240 | B2 * | 2/2011 | Joshi et al. ..................... 370/337 |
| 7,936,709 | B2 * | 5/2011 | Bhatti et al. ................... 370/326 |
| 2005/0074025 | A1 * | 4/2005 | Shao et al. ..................... 370/461 |
| 2005/0080924 | A1 | 4/2005 | Shang et al. |
| 2005/0201340 | A1 * | 9/2005 | Wang et al. .................... 370/337 |
| 2005/0286440 | A1 | 12/2005 | Strutt et al. |
| 2006/0128349 | A1 | 6/2006 | Yoon |
| 2007/0019604 | A1 * | 1/2007 | Hur et al. ...................... 370/347 |
| 2008/0316966 | A1 * | 12/2008 | Joshi et al. .................... 370/330 |
| 2009/0022136 | A1 * | 1/2009 | Joshi et al. .................... 370/348 |

FOREIGN PATENT DOCUMENTS

WO    WO 01/28170    4/2001

OTHER PUBLICATIONS

Loscri et al., "Performance Evaluation of AODV Protocol over E-TDMA MAC Protocol for Wireless Ad Hoc Networks"Telecimmunications and Networking—ICT 2004; Lecture Notes in Computer Science v 3124 pp. 417-424.
Kanzaki et al., "On TDMA Slot Assignment Protocol Considering the Existence of Unidirectional Wireless Links in Ad Hoc Sensor Networks", Mobile Data Management 2006, 7th Intl. Conference.
Chen et al., "Self Organization and Energy Efficient TDMA MAC Protocol by Wake Up for Wireless Sensor Networks", Sensor and ad hoc Communications and Networks 2004, 1st annual conference, pp. 335-341.
Kanzaki et al., "An adaptive TDMA slot assignment protocol in ad hoc sensor networks", Mar. 13-17, 2005, pp. 1160-1165, 2005 ACM Symposium on Applied Computing.

* cited by examiner

*Primary Examiner* — Dmitry H Levitan
(74) *Attorney, Agent, or Firm* — Lumen Patent Firm

(57) ABSTRACT

Communication in a broadcast-only distributed wireless network of nodes is provided. Each of the nodes of the network uses a repeated communication frame with an idle period and a TDMA schedule for active communication. The active TDMA schedule of at least some of the nodes in the network are aligned and synchronized. The distributed network does not require a central node for coordinating the TDMA schedules of another node or for synchronizing the communication frames. TDMA slots of the TDMA schedule are used for broadcasting and receiving messages. A node broadcasts a message without the use of an address of the receiving node. Communication frames having dynamic properties, such as communication frame length and start time, TDMA schedule position and length, and idle period position and length, are provided. Distributed functions for nodes to search for and synchronize with other nodes are also provided.

23 Claims, 8 Drawing Sheets

BROADCAST-ONLY DISTRIBUTED WIRELESS NETWORK

FIELD OF THE INVENTION

The invention relates generally to communication networks. More particularly, the present invention relates to a media access control (MAC) layer using a time division multiple access (TDMA) protocol for a distributed wireless network.

BACKGROUND

Wireless networks, such as wireless sensor networks, serve a wide variety of applications, including monitoring, imaging, and tracking, for industrial and military applications. Many existing wireless networks rely on a media access control (MAC) layer using time division multiple access (TDMA) protocols to manage the communication between nodes of the wireless network. The design of the MAC layer and TDMA protocols must take into account the possible complexities of the network involving mobile nodes and energy consumption considerations. Energy efficiency is particularly important for certain sensor or actuator devices with lifetimes determined by the built-in batteries of the devices.

TDMA protocols enable multiple nodes to share a single communication channel by partitioning the communication channel into multiple slots. However, communication in a network with existing TDMA-based MAC layers typically requires one or more central or beacon controllers to coordinate the allocation and timing of the slots. In addition to coordinating the TDMA schedules, central control is necessary to maintain synchronization of the nodes. The scalability of existing centralized wireless networks, however, is inherently limited as a central controller can only manage a finite number of nodes. Furthermore, for networks having mobile nodes, the central controller must also account for nodes joining and leaving the network. For large networks, this accounting can be prohibitively burdensome.

In addition to being centralized, existing networks typically communicate using address-specific messaging. In other words, a transmitted message must include an address for the recipient. The use of addresses requires each node to know, store, and process information regarding other nodes in the network, which can be time and energy consuming. Address-specific messaging also generally requires RTS (request to send), CTS (clear to send), or ACK (acknowledge) messages or functions, which further increases usage of energy and time.

The TDMA protocols used in existing wireless networks typically possess fixed properties, such as the number and allocation of the TDMA communication slots. For networks with high node density, collisions often occur because the fixed TDMA protocols are inadequate for the large number of nodes transmitting and receiving messages and cannot adjust to accommodate the required high data rates. On the other hand, for networks with low node density, the number and allocation of TDMA communication slots are often in excess of the actual usage by the network. Under the latter situation, resources can be wasted and performance may suffer.

The present invention addresses at least the difficult problems of communication in a wireless network and advances the art with a TDMA-based MAC protocol for communication in an ad-hoc distributed wireless network.

SUMMARY OF THE INVENTION

The present invention is directed to a control layer, such as a media access control (MAC) layer, for a broadcast-only distributed wireless network of a plurality of nodes. The nodes can have no devices, or the nodes can include sensor devices and/or actuator devices. Each of the nodes uses repeated communication frames. Each communication frame includes an idle period and a time division multiple access (TDMA) schedule for active communication. The TDMA schedule includes TDMA slots for transmitting messages and receiving messages. Preferably, none of the nodes of the distributed network coordinates the TDMA schedule and TDMA slots of another of the nodes. A broadcast function is provided to allow each of the nodes to broadcast a message, where the broadcasted message preferably does not include an address of another node. A listen function is provided to allow each of the nodes to listen for and receive one or more of the broadcasted messages. An ignore function is also provided for a node to ignore one or more of the broadcasted messages.

The communication frames of some, a majority, or all of the nodes in a network are in synchronization. This means that the TDMA schedule of the nodes at least partially overlap in time to enable optimal communication between nodes.

The communication frames of each of the nodes in the present invention can have variable or fixed length. The communication frame length can range between about 0.5 seconds to about 5 seconds. In an embodiment of the present invention, the idle period is longer than the TDMA schedule. In addition, the length of the TDMA schedule of a node can also be changed by the node. The TDMA schedule length can be changed based on the number of neighboring nodes. Each of the nodes dynamically allocates its TDMA slots to be a listen slot, a transmit slot, or an idle slot. In an embodiment, each node can measure the usage of its TDMA slots by its neighboring nodes and allocate the TDMA slots based on the measured usage. In an embodiment, the width of a TDMA slot is larger than the time-on-air of a broadcasted message.

In a preferred embodiment, each of the broadcasted messages includes an identifier of the TDMA slot used to broadcast the message. To decrease the effects of clock drift, each of the nodes can determine the start time of its communication frame. The start time determination includes receiving one or more broadcasted messages, including the TDMA slot identifier for each of the broadcasted messages, and calculating a time shift based on the received broadcasted messages. The time shift is used to determine the start time of an ensuing communication frame. The start time determination can also include measuring an arrival time for each of the received messages and basing the time shift at least partially on the arrival times. In an embodiment, each of the broadcasted messages also includes TDMA slot usage information. The slot usage information includes information on whether or not a listen slot has received a message from a neighboring node or if a collision has been detected.

In an embodiment, a search function is provided for each of the nodes. The search function is activated if the node has not received any broadcasted messages during a number of communication frames. The search function is activated until the node receives a message broadcasted by another node. While the search function is activated, one or more properties of the communication frame of the searching node can be changed. The properties that can be changed include the start time of the communication frame, the length of the communication frame, the position of the TDMA schedule in the communication frame, the length of the TDMA schedule, the position of the idle period in the communication frame, the length of the idle period, or any combination thereof.

An embodiment of the present invention is also directed to synchronizing nodes of a distributed wireless network. Each of the nodes uses a repeated communication frame, including an idle period and a TDMA schedule for active communication. A join function is provided to each of the nodes for broadcasting a join message from a random position in the idle period of the communication frame. The join message includes the random position in the idle period. Another of the nodes receives the join message in the TDMA schedule of the receiving node. The receiving node can then shift the position of its TDMA schedule based on the random position of the received join message. The shift approximately synchronizes the communication frame of the receiving node with the communication frame of the broadcasting node. Preferably, each of the nodes that are not in search mode transmits a join message from a random position in the idle period of every communication frame.

BRIEF DESCRIPTION OF THE FIGURES

The present invention together with its objectives and advantages will be understood by reading the following description in conjunction with the drawings, in which.

DETAILED DESCRIPTION OF THE INVENTION

A communication system between a plurality of nodes in an ad-hoc network can be difficult to implement, particularly with mobile nodes, commonly found in ad-hoc wireless sensor networks. The present invention is directed to communication between nodes in a distributed network using a media access control (MAC) layer optimized for gossip protocols. The scalability of the communication system of the present invention is apparent by the communication system's decentralized and distributed nature.

Figure 1:
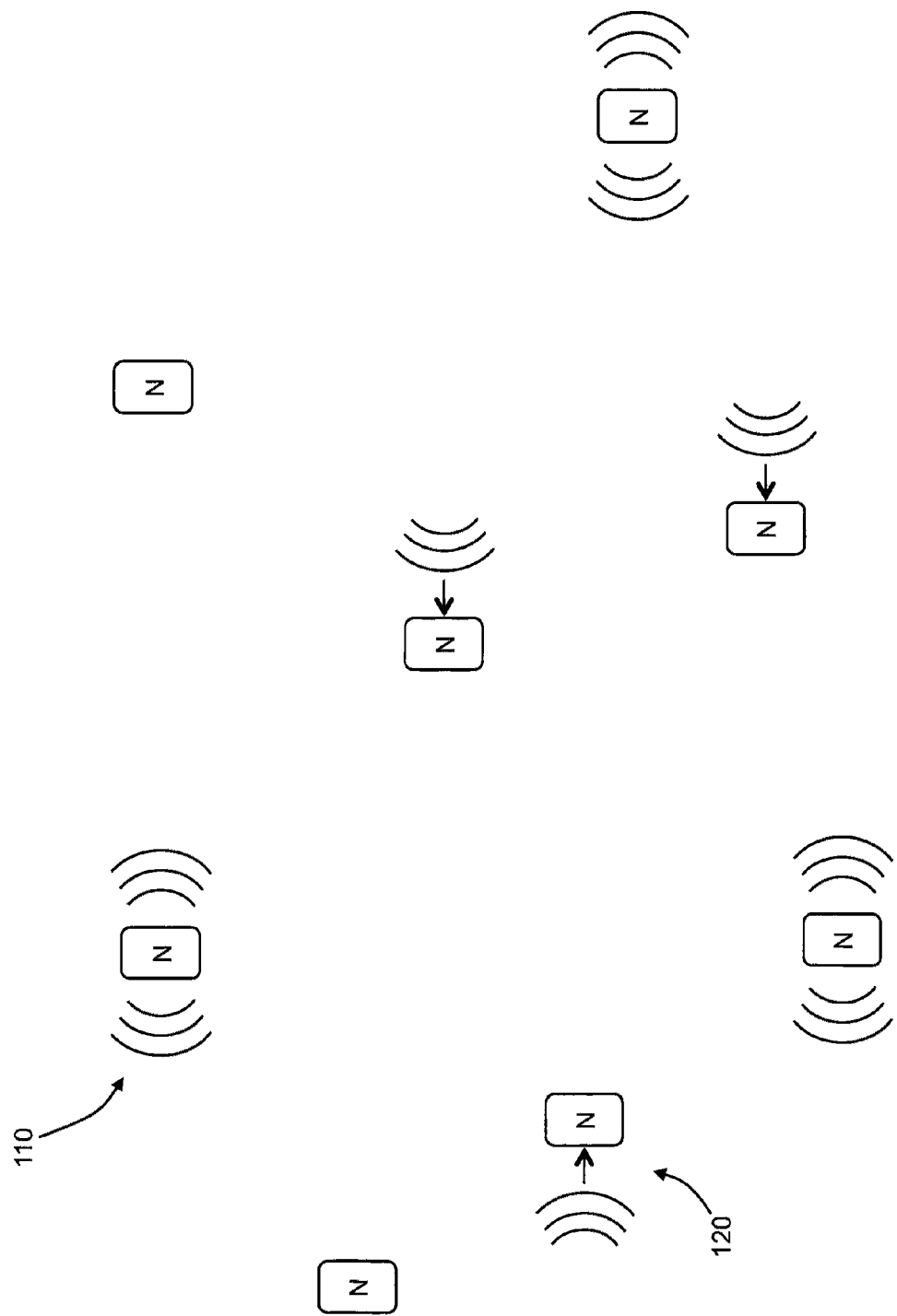
FIG. 1 shows an example of a plurality of wireless nodes communicatively connected through a broadcast-only network according to the present invention.

FIG. 1 shows an example of a distributed network of a plurality of wireless nodes N according to the present invention. The distributed network can include any number of nodes. Each of the nodes of the distributed network can broadcast 110 or receive 120 messages from its neighboring nodes. In a preferred embodiment, the nodes are wireless sensor and/or actuator nodes, or nodes without any sensor and/or actuator device. However, any device capable of bidirectional communication can be a node in the network. Though the present invention is suited for wireless networks, one or more wired nodes can also be members of the network.

Figure 2:
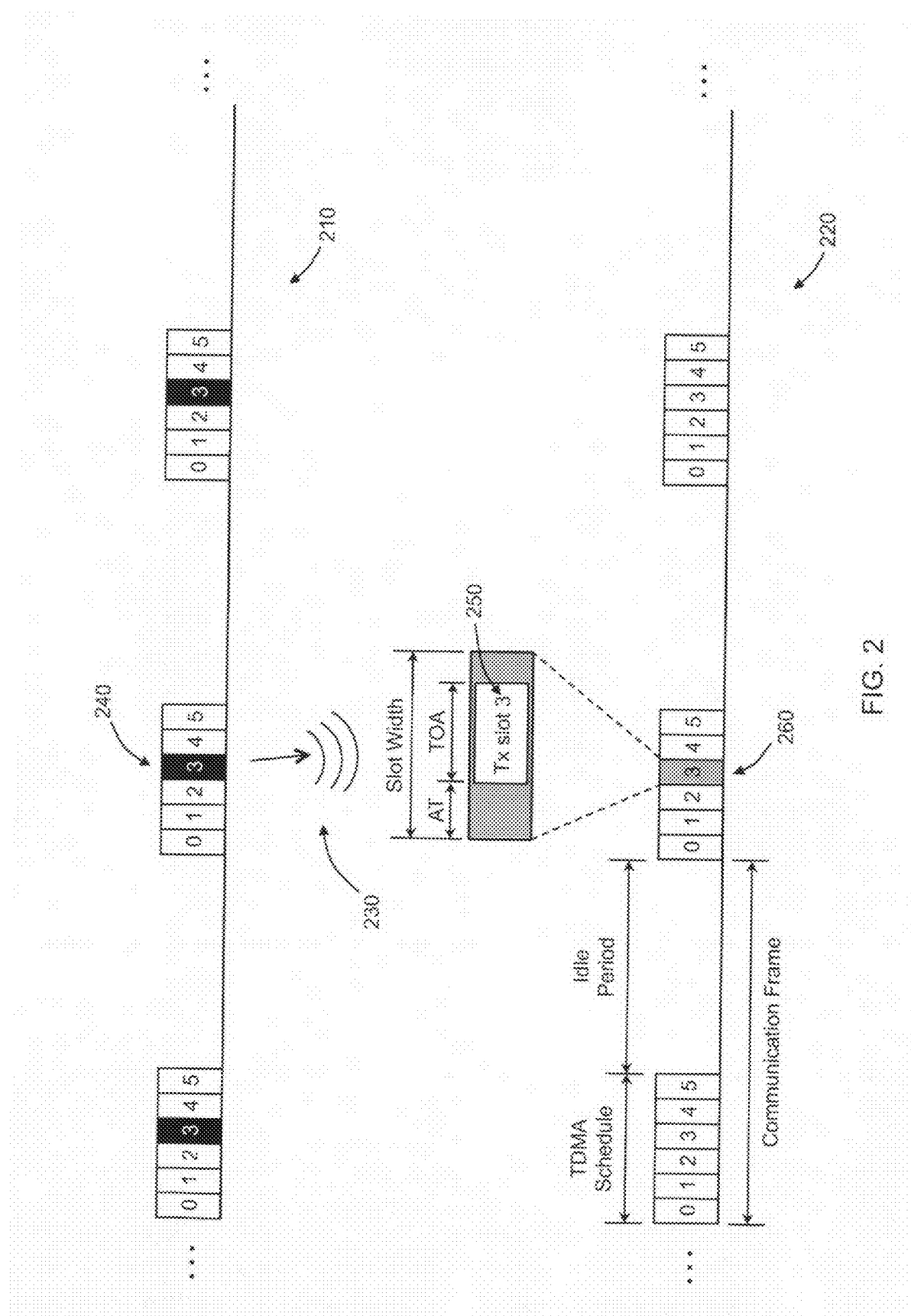
FIG. 2 shows an example of synchronized communication frames that include an active TDMA schedule with TDMA slots and an idle period according to the present invention.

At least some of the nodes are communicatively connected and communicate with the use of repeated communication frames. FIG. 2 shows a repeated communication frame of a broadcasting node 210 and a repeated communication frame of a listening node 220. Each communication frame includes an idle period and a time divisional multiple access (TDMA) schedule for active communication. The TDMA schedule includes a plurality of TDMA slots. A broadcast function is provided for each of the nodes to use one or more of the TDMA slots to broadcast messages. A listen function is also provided for each of the nodes to listen for and receive a broadcasted message. One or more TDMA slots are used to listen for and receive the broadcasted messages. For example, FIG. 2 shows a node broadcasting 230 a message through a TDMA slot 240 and another node receiving the broadcasted message in slot 260. Preferably slot 240 and slot 260 have the same slot number. Preferably, each of the broadcasted messages includes an identifier 250 of the TDMA slot used to broadcast the message. The identifier 250 can be a part of the MAC header of the broadcasted message.

Slot usage information can also be a part of the MAC header of the broadcasted message. The slot usage information includes information that a listen slot has received a message, that no message has been received from a neighboring node, and/or if a collision has been detected. The slot usage information can be used to prevent the hidden terminal problem. In an embodiment, each node does not broadcast any messages during one frame and evaluates the slot usage information of its neighbors in the next frame. By repeating this process over a randomized interval of frames, preferably from about 15 to 20 frames, the hidden terminal problem can be avoided.

It is important to note that the distributed network of the present invention does not require a central or beacon node coordinating the other nodes. Particularly, in a preferred embodiment of the present invention, none of the nodes in the network coordinates the TDMA schedule and the TDMA slots of another node of the network. The distributed functions for the nodes include network synchronization, TDMA schedule length and position, TDMA slot allocation, collision avoidance, and hidden-terminal avoidance. The broadcast function allows a node to transmit a message by a broadcast-only mechanism, which does not require an address of another node. The neighboring nodes have control over what to do with the broadcasted message. In other words, a neighboring node can decide to receive and process the message, to receive and discard the message, or use a provided ignore function to not listen for any broadcasted messages.

In a preferred embodiment, some of the nodes, a majority of the nodes, or all of the nodes in the network are approximately synchronized. Synchronized nodes have communication frames with time overlapping TDMA schedules to allow communication between nodes. In other words, overlapping TDMA schedules enable a message broadcasted from a TDMA slot of one node to be received by a TDMA slot of another node.

With a broadcast-only distributed communication system, the nodes can be extremely energy efficient. Moreover, by constraining the slot allocation of a TDMA schedule, the energy consumption is deterministic and therefore battery life and/or energy scavenging mechanisms become predictable. In addition, the distributed network of the present invention is also scalable, unlike existing centralized networks. Furthermore, in contrast to standard address-oriented message systems, the broadcast-only communication system of the present invention does not require CTS, RTS, or ACK messages or functions.

In an embodiment of the present invention, the communication frame of each of the nodes has a fixed length. The fixed length of the communication frame ranges between about 0.5 seconds and about 5 seconds, and is preferably about 1 second. In an alternative embodiment, the communication frame of each of the nodes has a variable length. A node may vary its communication frame length based on energy consumption and data throughput requirements. Shorter communication frames generally increase energy consumption, while allowing for greater data throughput.

Figure 3B:
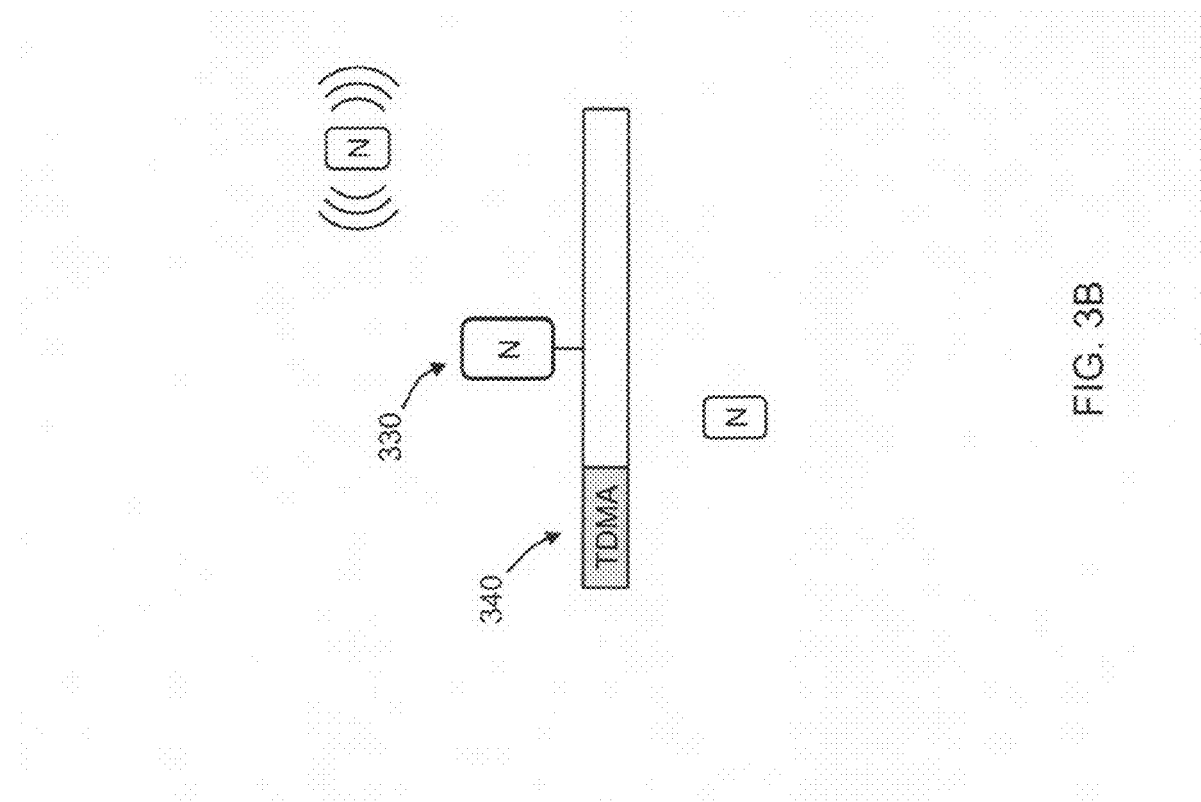
FIGS. 3A-3B show an example of a dynamic TDMA schedule length for a node based on the number of neighboring nodes according to the present invention.
Figure 3A:
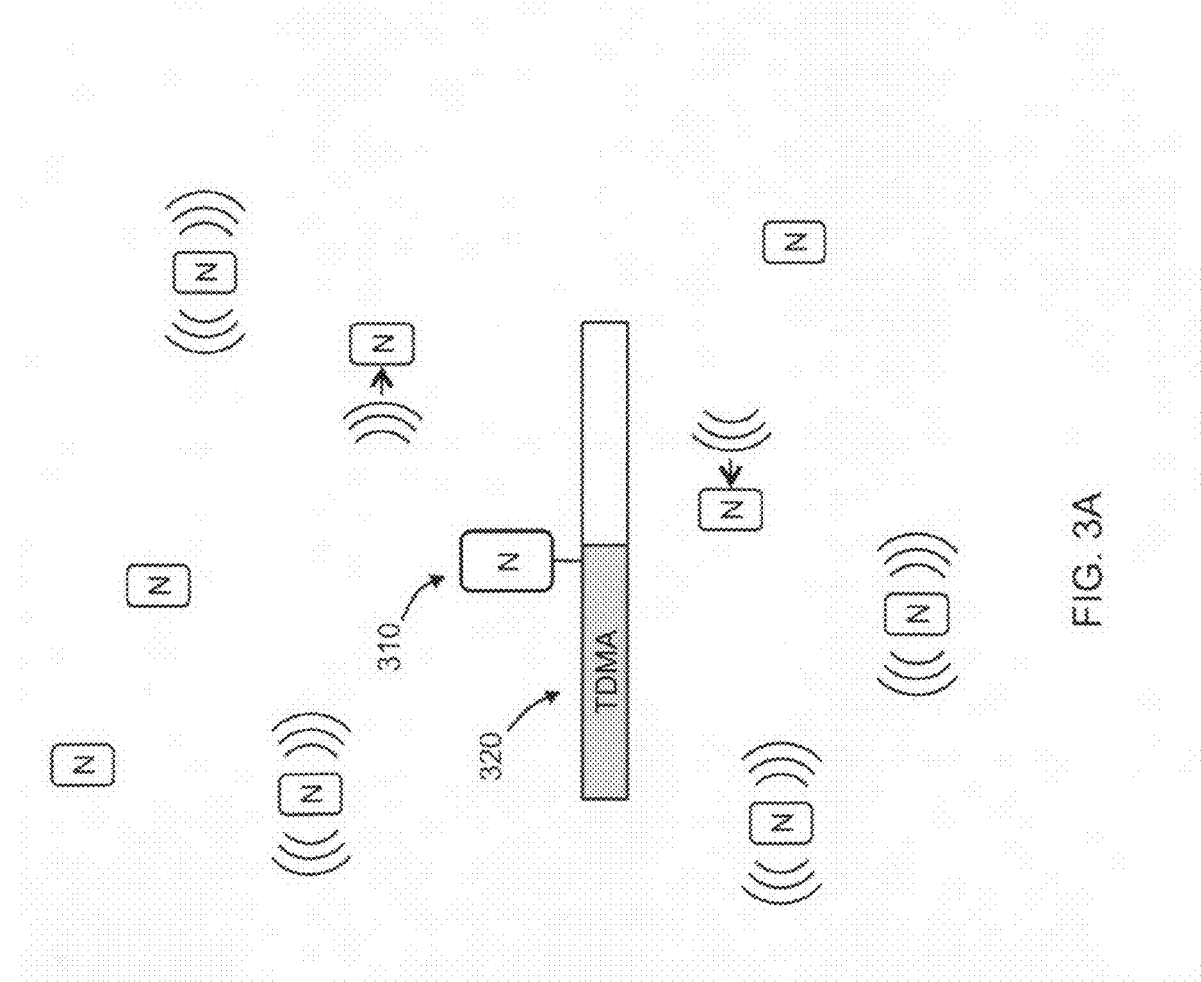

As mentioned above, each communication frame includes a TDMA schedule for active communication and an idle period, where little or no activity occurs. In an energy-efficient embodiment, the idle period is longer than the TDMA schedule. Preferably, the length of the TDMA schedule, defined by the number of TDMA slots, of a node can be changed. The change in length of the TDMA schedule can be based on the number of neighbors of the node. FIG. 3A shows an example of a node 310 with a large number of neighboring nodes. To avoid or minimize collisions, the node 310 increases its TDMA schedule 320 (i.e. increases the number of TDMA slots) to accommodate the large number of neighbors. FIG. 3B shows the opposite situation, in which a node 330 has only a small number of neighboring nodes, thus its TDMA schedule 340 is shorter than the TDMA schedule 320 of node 310.

In a preferred embodiment, each of the TDMA slots of the TDMA schedule is allocated to be a listen slot, a transmit slot, or an idle slot. Each of the nodes controls the allocation of its TDMA slots. When a TDMA slot is allocated for a specific function, the entire duration of the slot is dedicated for that same function. For example, in FIG. 2, the broadcasting node 210 has allocated TDMA slot 3 to be a transmit slot and the receiving node 220 has allocated TDMA slot 3 to be a listen slot. When two or more adjacent slots are allocated with the same function, a contiguous period occurs for that function. In a preferred embodiment, the allocation of TDMA slots is dynamic, where a node measures the usage of the TDMA slots by neighboring nodes and allocates the TDMA slots based on the measured usage of the TDMA slots, and/or the usage of the TDMA slots of the neighboring nodes, provided in the slot usage information provided in the header of each message.

It is important to note that the width of each of the TDMA slots is greater than a time-on-air TOA of each of the broadcasted messages. Having the TDMA slot width greater than the time-on-air allows the nodes to compensate for clock drifts between nodes and remain in communicative contact with other nodes. For each message received, an arrival time AT can also be measured upon reception of the message. The arrival time is the difference in time between the actual position of the received message and the beginning of the TDMA slot receiving the message.

In an embodiment, the time-on-air period is based on the data rate and the payload length. For example, data rates can range between about 250 kbps and about 2 Mbps, and payload lengths can range between about 32 bytes to 128 bytes. With these data rates and payload lengths, the time-on-air period ranges from about 300 μs to about 10 ms. In a preferred embodiment, the time-on-air period is about 300 μs and the TDMA slot width is about 800 μs.

Figure 4:
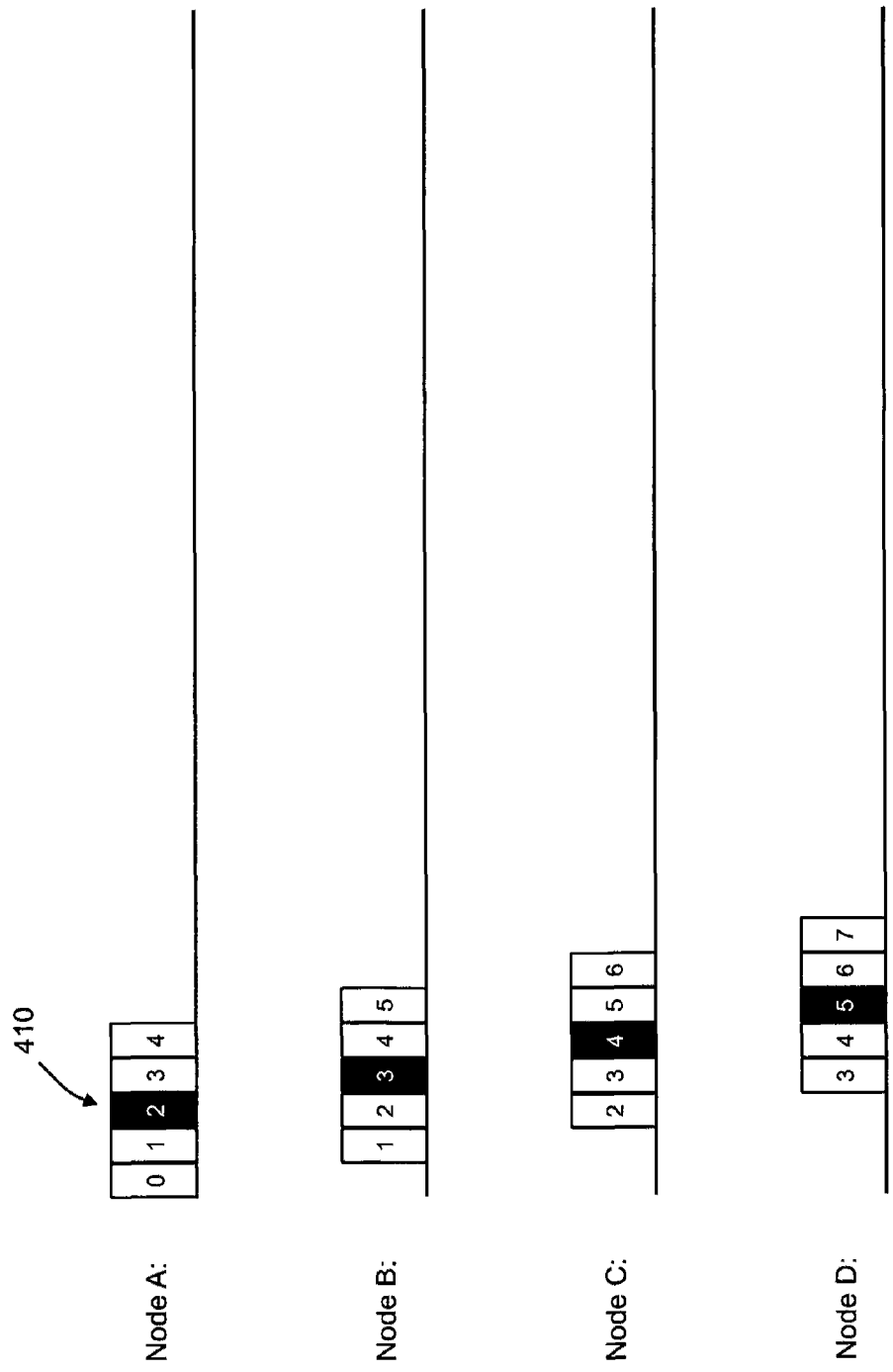
FIG. 4 shows an example of the communication frames of four nodes having swarm TDMA schedules according to the present invention.

In an embodiment, the TDMA schedule of each of the nodes can also be dynamic in position. FIG. 4 shows the communication frame for four nodes, A-D, capable of having a "swarm"-like behavior. The position of the TDMA schedules of each of the nodes is dependent on the positions of the TDMA of the neighboring nodes. In an exemplary embodiment, the TDMA schedule of each node has fixed number of slots with the middle slot 410 allocated to be a transmit slot. The transmitted messages can include slot usage information that the receiving nodes can use to adjust its TDMA schedule position. With the swarm-like TDMA schedules, as represented in FIG. 4, the nodes have symmetrical communication properties with its neighbors. The constant TDMA schedule length allows for a known energy consumption and predictable battery life of nodes.

Figure 5:
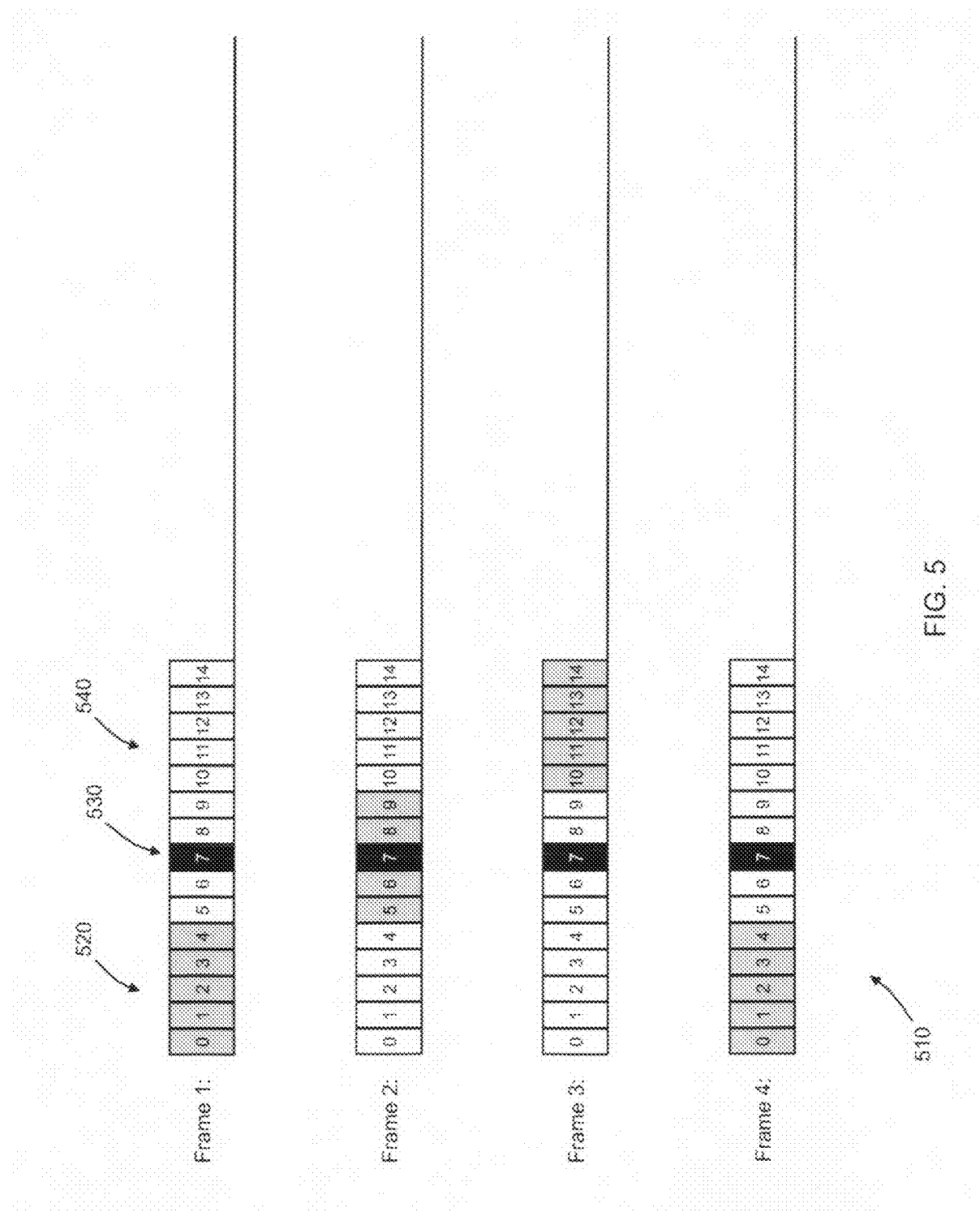
FIG. 5 shows an example of consecutive communication frames of a single node having a cluster TDMA schedule according to the present invention.

Embodiments of the present invention can include dynamic allocation of the TDMA slots. FIG. 5 shows four consecutive communication frames of a single node having a cluster TDMA schedule 510. Under the cluster TDMA schedule scheme, the TDMA schedule length of a node is rounded to a multiple of a cluster length. Only one cluster is active per communication frame, as represented by the shaded TDMA slots 520 in FIG. 5. The TDMA slots of the active cluster can be allocated to be listen slots, whereas the TDMA slots not in the active cluster can be allocated to be idle slots 540. The node schedules the next cluster to be active in the next communication frame. In an embodiment, while the clusters are scheduled over the frame, the transmit TDMA slot 530 remains at the same position. Though the cluster length is shown to be 5 TDMA slots in FIG. 5, any cluster length can be employed. The use of a cluster TDMA schedule allows a node to receive messages from many neighbors, distributed over time using multiple frames. In addition, the energy consumption remains constant and is independent of the number of neighbors.

In another embodiment of the present invention, communication between nodes in a crowded environment can rely on a constant length TDMA schedule with transmit slot skipping. The TDMA schedule length can be determined based on available energy and required data throughput with the neighboring nodes. The transmit TDMA slot allocation can be based on slot usage information of the node itself and/or the slot usage information of the neighboring nodes. Transmit slot skipping is activated when there are more neighbors than available TDMA slots in the TDMA schedule. In such a circumstance, a node will decide to skip a transmission in one or more frames. The transmit TDMA slot is temporarily allocated to be a listen slot to receive messages from the neighbors using the same slot during the one or more frames. With transmit slot skipping, the node is capable of communicating with other nodes in a crowded environment without having to add TDMA slots, thereby maintaining low energy consumption.

Communication between nodes in the distributed network requires the communication frames of the nodes to be approximately synchronized. More generally, communication is possible when the TDMA schedules of communicating nodes at least partially overlap. Node synchronization exists when the communication frames of communicating nodes start at approximately the same time. Synchronization is difficult to maintain due to clock drift. In an embodiment of the present invention, each node can occasionally or periodically update its communication frame start time to stay approximately synchronized with the rest of the network. It is important to note that this update does not require communications with a central time-keeping node.

Figure 6:
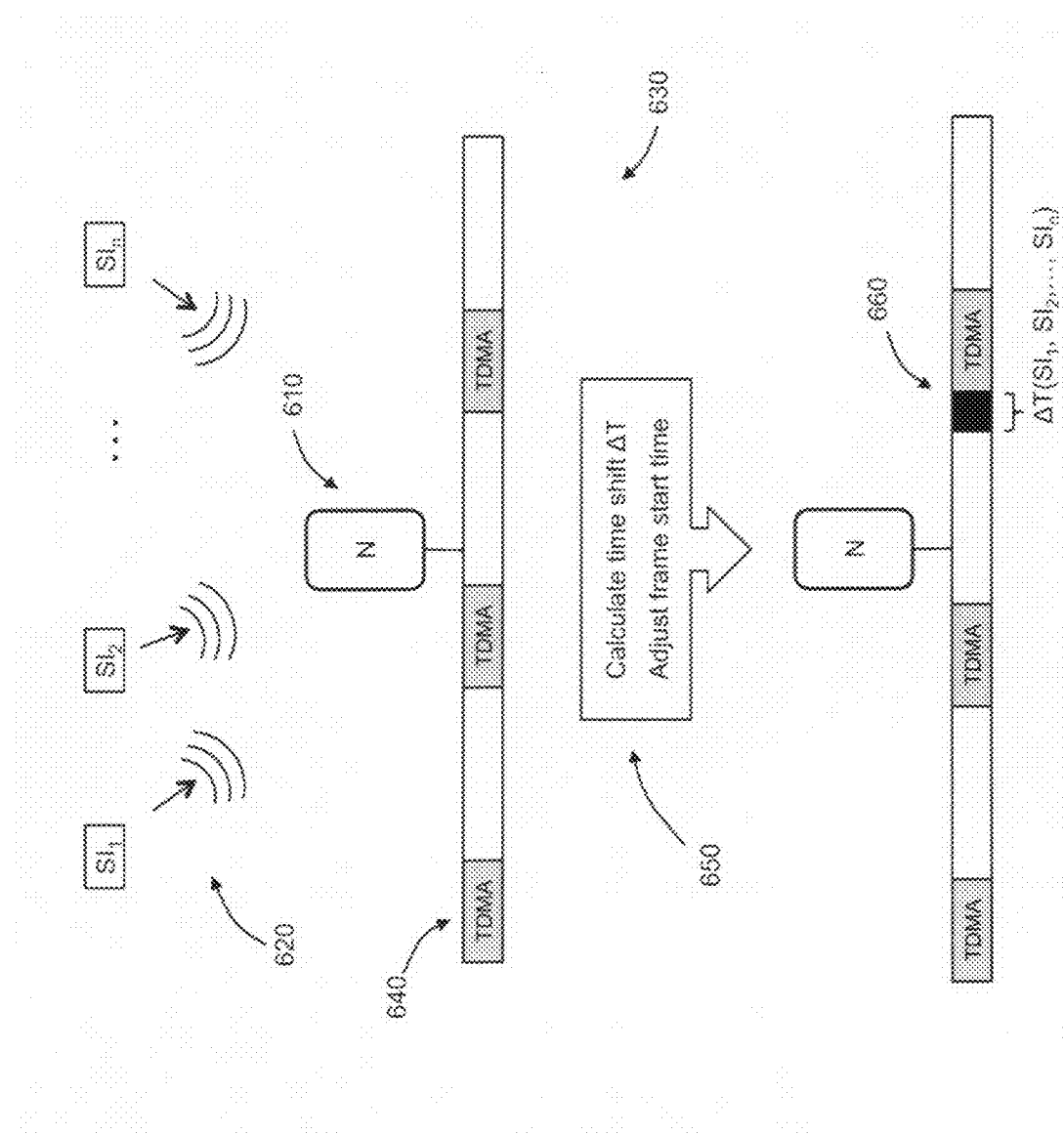
FIG. 6 shows an example of determining the start time of a communication frame of a node based on received messages according to the present invention.

FIG. 6 shows a node 610 determining the start time for its repeated communication frame 630 and the TDMA schedule 640. Node 610 receives one or more broadcasted messages 620 from its neighbors. The broadcasted messages 620 include slot identifiers $SI_1$-$SI_n$, for identifying the TDMA slots used to transmit the broadcasted messages 620. A time shift ΔT is calculated 650 based at least partially on the received slot identifiers $SI_1$-$SI_n$. The time shift ΔT is used to determine and adjust the start time 660 of the communication frame 630. The adjustments to the communication frame start time 660 help to prevent the loss of synchronization of a node with the rest of the network due to drift in the node's internal clock. In another embodiment, a node measures the arrival times of the received messages in addition to the slot identifiers $SI_1$-$SI_n$, and calculates the time shift ΔT based on the arrivals times and the slot identifiers $SI_1$-$SI_n$.

The time shift calculation can involve any calculus that mitigates the effects of clock drift. Example time shift calculations include taking the average or median of the slot identifiers and/or arrival times. In an embodiment, the time shift uses the following calculation: $\Delta T = G * \text{median}[\delta T(Rx_1), \delta T(Rx_2), \ldots, \delta T(Rx_n)]$, where G is a gain factor and $\delta T(Rx_i)$ is the difference between the expected arrival time and the actual arrival time of the $i^{th}$ received message. The gain factor G preferably ranges between 0.5 and 1, and is typically 0.75.

Though FIG. 6 shows an adjustment of the communication frame start time based on received messages, there are circumstances when a node cannot communicate with any of the other nodes in the network, i.e. the active TDMA schedule of the node does not overlap with the TDMA schedule of any of the neighboring nodes. For example, loss of synchronization can arise when a node is isolated from the rest of the network for a sufficiently long time for its TDMA schedule to drift away. When the isolated node attempts to rejoin the network and communicate with the other nodes, it fails due to the non-overlapping TDMA schedules.

Figure 7:
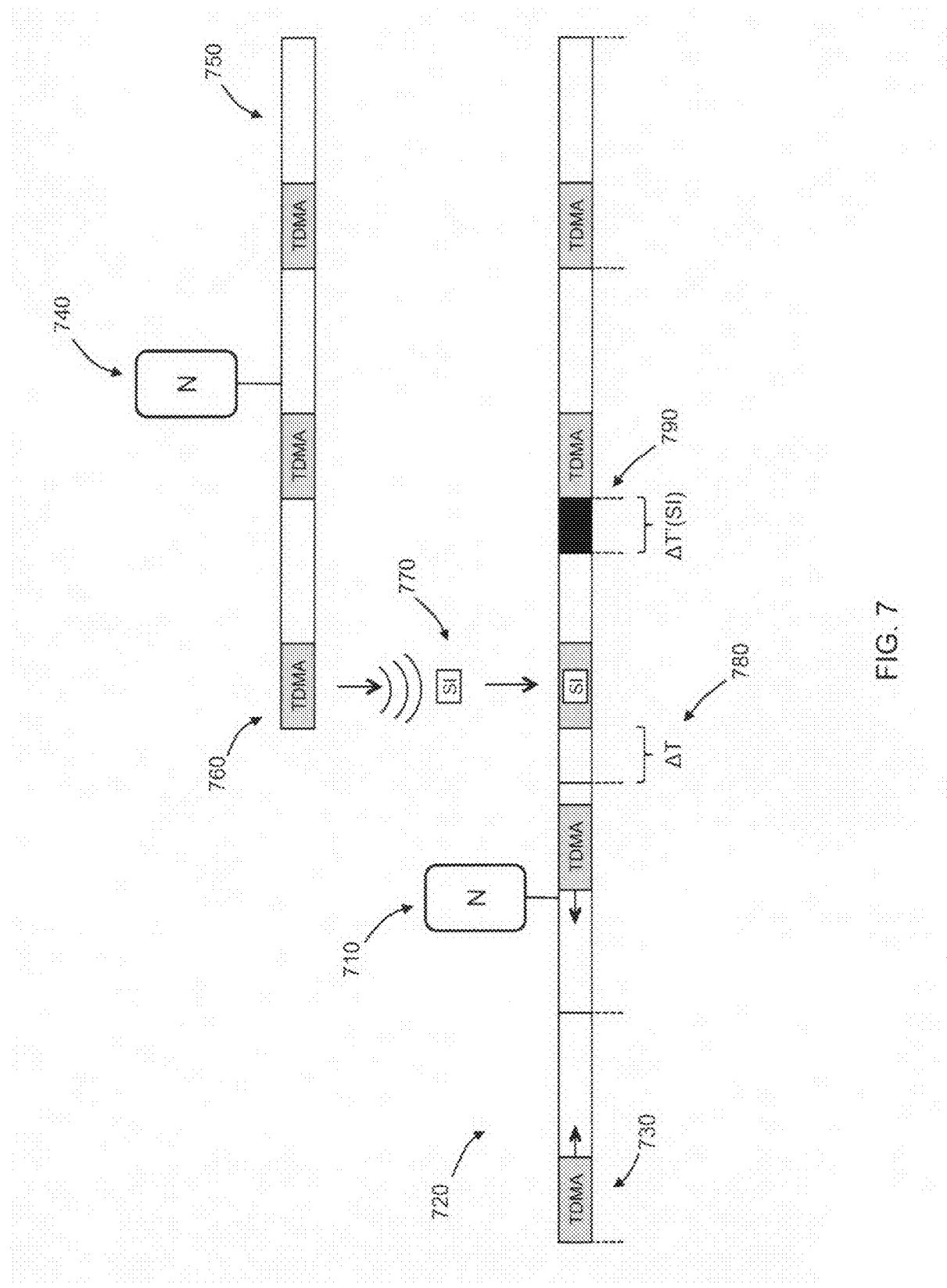
FIG. 7 shows an example of a search function allowing a node to change a property of its communication frame to search for another node according to the present invention.

FIG. 7 shows an example search function for a node 710 to find one or more other nodes in the network. The node 710 activates the search function only if it has not received any broadcasted messages during a number of consecutive communication frames 720. In an embodiment, the number of consecutive communication frames to activate the search function is about 30. When the communication frame length is one second, this corresponds to half a minute of having no communication before a nodes enters the search mode. When activated, the search function allows the node to change one or more properties of its communication frame, including the start time of the communication frame, the length of the communication frame, the position of said TDMA schedule in the communication frame, the length of the TDMA schedule, the position of the idle period in the communication frame, the length of the idle period, or any combination thereof.

In FIG. 7, node 710 is in search mode and moves the position of its TDMA schedule 730 until the TDMA schedule 730 overlaps with a TDMA schedule 760 of a neighboring node 740. Enabled by the overlap in the TDMA schedules, node 710 can potentially receive a message 770 broadcasted by the neighboring node 740. The broadcasted message 770 can include the slot identifier SI and/or a measured arrival time. The received message along with the known moved position ΔT of the TDMA schedule 730 during searching can be used to synchronize node 710 with node 740. Once in communication with another node, the search function is deactivated.

In another embodiment of the present invention, a node operating the search function performs the following steps: (1) Increase the communication frame length from T(idle)+T(TDMA) to T(idle)+2*T(TDMA), where T(idle) is the length of the idle period and T(TDMA) is the length of the TDMA schedule. (2) Search with the communication frame length of step (1) for [T(idle)+T(TDMA)]/T(TDMA)+1 cycles. (3) Decrease the communication frame length to T(idle) for the same number of cycles as in step (2). The node will repeat steps (1)-(3) until it receives a message from a neighboring node. After the message is received, the searching node approximately synchronizes with the node that broadcasted the received message. The communication frame length is reset back to T(idle)+T(TDMA) after the search is successful.

Figure 8:
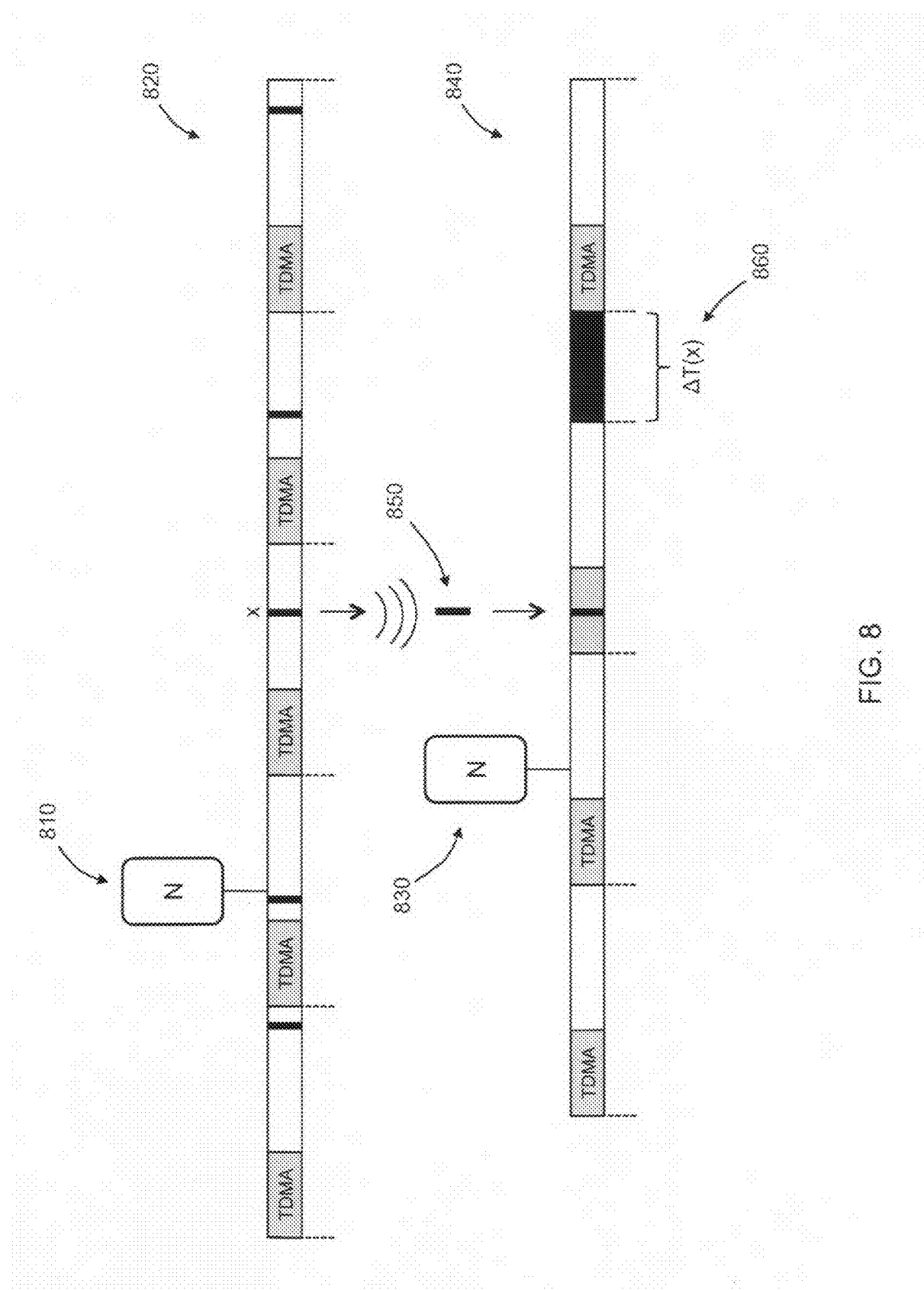
FIG. 8 shows an example of a join function allowing a node to broadcast a join message from a random position according to the present invention.

In a preferred embodiment of the present invention, a join function is provided to the nodes of the distributed network for synchronization of nodes. FIG. 8 shows an example of the join function for synchronizing the communication frame 840 of node 830 to the communication frame 820 of node 810. When operating the join function, node 810 transmits a join message from a random position in the idle period of each communication frame 820. By a stochastic process, one of the join messages 850 transmitted from a random position x will overlap with a TDMA schedule of the communication frame 840 of another node 830. The join message 850 includes the random position x. In an embodiment, the join message 850 does not include any other information other than the random position x. Upon reception of the join message 850, node 830 can shift its TDMA schedule by a time shift ΔT(x) to approximately synchronize node 830 to node 810. The time shift ΔT(x) is at least partially based on the random position x.

In a preferred embodiment, each node transmits a join message during every communication frame. Since the join message is transmitted from the idle period, when nodes are in synchronization, the join messages have no effect. Preferably, nodes with activated search functions do not transmit join messages.

The join function, as described above, allows for an energy efficient and scalable process for node synchronization. The join function can be used in circumstances in which the search function is not applicable. For example, when a plurality of nodes is subdivided into two or more groups with intra-group synchronized members, the search function will not be activated because there is no reason to begin searching when the members are already intra-group synchronized. Without operating the join function, inter-group communication is not possible and the groups will remain isolated from one another. When the join function is utilized, the multiple groups will eventually merge into one or a small number of groups. This merging of groups is accomplished in an undirected manner. In practice, a smaller group will likely synchronize to a larger group simply because the larger group has more join messages to broadcast than the smaller group.

As one of ordinary skill in the art will appreciate, various changes, substitutions, and alterations could be made or otherwise implemented without departing from the principles of the present invention, e.g. other wired and/or wireless devices can be members of the network, including data storage devices. Accordingly, the scope of the invention should be determined by the following claims and their legal equivalents.

What is claimed is:

1. A communication system in a distributed wireless network, said system comprising:
(a) a plurality of wireless nodes, wherein at least some of said plurality of nodes are communicatively connected, wherein each of said nodes uses repeated communication frames for said communication, wherein each of said communication frames comprises:

(i) a first period which is a time division multiple access (TDMA) schedule for active communication, wherein said TDMA schedule comprises a plurality of TDMA slots; and (ii) a second period, wherein little or no activity occurs in said second period;

(b) a broadcast function for allowing each of said plurality of nodes to broadcast a message, wherein one of said TDMA slots is used to broadcast said message, and wherein said message broadcasted by each of said nodes does not comprise an address of another of said nodes and includes an identifier of the TDMA slot used to broadcast the message; and (c) a listen function for allowing each of said plurality of nodes to listen for said broadcasted messages, wherein one or more of said TDMA slots is used to listen for one or more of said broadcasted messages, and wherein said listen function allows a listening node to receive one or more of said broadcasted messages;

wherein a start time of said repeated communication frame for one of said nodes is determined by:

(i) receiving one or more of said broadcasted messages;

(ii) calculating a time shift, wherein said time shift is calculated based at least partially on said TDMA slot identifiers of each of said received messages; and (iii) determining said start time of said repeated communication frame of said receiving node based on said calculated time shift.

2. The system as set forth in claim 1, wherein none of said plurality of nodes coordinates said TDMA schedule and said TDMA slots of another of said nodes.

3. The system as set forth in claim 1, further comprising an ignore function for allowing each of said plurality of nodes to ignore said broadcasted messages.

4. The system as set forth in claim 1, wherein said communication frame of each of said nodes has a variable length.

5. The system as set forth in claim 1, wherein said communication frame of each of said nodes has a fixed length, and wherein said fixed length of said communication frame ranges between about 0.5 seconds to about 5 seconds.

6. The system as set forth in claim 1, wherein said second period is longer than said TDMA schedule.

7. The system as set forth in claim 1, wherein the length of said TDMA schedule for a selected one of said nodes can be changed by the selected node, and wherein the length of said TDMA schedule is changed based on a number of neighboring nodes for the selected node.

8. The system as set forth in claim 1, wherein each of said TDMA slots of each of said nodes is allocated by the same of said nodes to be a listen slot, a transmit slot, or an idle slot.

9. The system as set forth in claim 8, wherein said allocation of each of said TDMA slots is dynamic, wherein each of said nodes can have one or more neighboring nodes, and wherein said dynamic allocation of each of said TDMA slots of a selected one of said nodes is based on a usage of said TDMA slots by said neighboring nodes of the selected node.

10. The system as set forth in claim 1, wherein each of said TDMA slots has a width, wherein each of said broadcasted messages has a duration, and wherein said width of each of said TDMA slots is longer than said duration of each of said broadcasted messages.

11. The system as set forth in claim 1, wherein said plurality of nodes comprises one or more sensor devices, one or more actuator devices, or any combination thereof.

12. A method for distributed wireless communication between a plurality of nodes, said method comprising:

(a) partitioning a repeated communication frame of each of said plurality of nodes into a first period which is a time division multiple access (TDMA) schedule and a second period wherein little or no activity occurs, wherein said TDMA schedule is for active communication, and wherein said TDMA schedule comprises a plurality of TDMA slots;

(b) providing a broadcast function for allowing each of said plurality of nodes to broadcast a message, wherein one of said TDMA slots is used to broadcast said message, and wherein said message broadcasted by each of said nodes does not comprise an address of another of said nodes and includes an identifier of the TDMA slot used to broadcast the message;

(c) providing a listen function for allowing each of said plurality of nodes to listen for said broadcasted messages, wherein one or more of said TDMA slots is used to listen for one or more of said broadcasted messages, and wherein said listen function allows a listening node to receive one or more of said broadcasted messages; and (d) determining a start time of said repeated communication frame for one of said nodes, said start time determining comprising:

(i) receiving one or more of said broadcasted messages;

(ii) calculating a time shift, wherein said time shift is calculated based at least partially on said TDMA slot identifiers of each of said received messages; and (iii) determining said start time of said repeated communication frame of said receiving node based on said calculated time shift.

13. The method as set forth in claim 12, wherein said method comprises a media access control (MAC) protocol.

14. The method as set forth in claim 12, further comprising dynamically determining the length of said TDMA schedule for a selected one of said nodes, wherein the length of said TDMA schedule is determined based on a number of neighboring nodes of the selected node.

15. The method as set forth in claim 12, further comprising dynamically allocating said TDMA slots of each of said nodes, wherein each of said TDMA slots of each of said nodes is allocated to be a listen slot, a transmit slot, or an idle slot.

16. The method as set forth in claim 15, further comprising measuring a usage of said TDMA slots for one of said nodes, wherein said dynamic allocation of said TDMA slots of the same of said nodes is based on said measured usage.

17. The method as set forth in claim 12, wherein each of said TDMA slots has a width, wherein each of said broadcasted messages has a duration, and wherein said width of each of said TDMA slots is longer than said duration of each of said broadcasted messages.

18. The method as set forth in claim 12, wherein said start time determining further comprises measuring an arrival time for each of said received messages, and wherein said time shift is calculated based at least partially on said arrival time of each of said received messages.

19. The method as set forth in claim 12, further comprising providing a search function for a selected one of said nodes, wherein the selected node activates said search function if the selected node has not received any of said broadcasted messages during a predetermined number of said communication frames, and wherein said search function is activated until the selected node receives one of said messages broadcasted by another of said nodes.

20. The method as set forth in claim 19, wherein said search function allows each of said nodes to change one or more properties of said communication frame of the same of said nodes, said one or more properties comprise a start time of said communication frame, the length of said communication frame, the position of said TDMA schedule in said communication frame, the length of said TDMA schedule, the position of said second period in said communication frame, the length of said second period, or any combination thereof.

21. The method as set forth in claim 12, further comprising providing a join function for each of said nodes, wherein said join function allows each of said nodes to transmit a join message, wherein said join message is transmitted from a random position in said second period of said communication frame, and wherein said join message comprises said random position.

22. The method as set forth in claim 21, further comprising one of said nodes:
   (i) receiving said join message transmitted by another of said nodes; and
   (ii) shifting said TDMA schedule of said node receiving said join message, wherein said shifting approximately synchronizes said communication frame of said node receiving said join message with said communication frame of said node transmitting said join message.

23. A method of synchronizing nodes in a distributed wireless communication network of a plurality of nodes, said method comprising:

(a) providing a repeated communication frame for each of said plurality of nodes, wherein said communication frame comprises a first period which is a time division multiple access (TDMA) schedule and a second period wherein little or no activity occurs, and wherein said TDMA schedule is for active communication;

(b) broadcasting a join message, wherein said join message is broadcasted by one of said plurality of nodes, wherein said join message is broadcasted from a random position in said second period of said communication frame of said broadcasting node, and wherein said join message comprises said random position;

(c) receiving said join message, wherein said join message is received by another of said plurality of nodes, and wherein said join message is received within said TDMA schedule of said receiving node; and (d) shifting the position of said TDMA schedule in said communication frame of said receiving node, wherein said shifting is based on said random position of said received join message, and wherein said shifting approximately synchronizes said communication frame of said receiving node with said communication frame of said broadcasting node.

\* \* \* \* \*